(12) United States Patent
Ploquin et al.

(10) Patent No.: US 11,811,548 B2
(45) Date of Patent: Nov. 7, 2023

(54) SYSTEM AND METHOD FOR APPLIANCE CONFIGURATION IDENTIFICATION AND PROFILE MANAGEMENT

(71) Applicant: Barracuda Networks, Inc., Campbell, CA (US)

(72) Inventors: Phil Ploquin, Santa Clara, CA (US); Nicholas Tillman, Newark, CA (US); Hari Potaraju, San Jose, CA (US)

(73) Assignee: Barracuda Networks, Inc., Campbell, CA (US)

( * ) Notice: Subject to any disclaimer, the term of this patent is extended or adjusted under 35 U.S.C. 154(b) by 65 days.

(21) Appl. No.: 17/684,826

(22) Filed: Mar. 2, 2022

(65) Prior Publication Data

US 2023/0246870 A1 Aug. 3, 2023

Related U.S. Application Data

(60) Provisional application No. 63/305,751, filed on Feb. 2, 2022.

(51) Int. Cl.
*H04L 12/28* (2006.01)
*H04L 41/0806* (2022.01)
*H04L 67/133* (2022.01)

(52) U.S. Cl.
CPC ........ *H04L 12/281* (2013.01); *H04L 12/2814* (2013.01); *H04L 12/2816* (2013.01); *H04L 41/0806* (2013.01); *H04L 67/133* (2022.05); *H04L 2012/285* (2013.01)

(58) Field of Classification Search
CPC ............... H04L 12/281; H04L 12/2814; H04L 12/2816; H04L 41/0806; H04L 67/133; H04L 2012/285
See application file for complete search history.

(56) References Cited

U.S. PATENT DOCUMENTS

| | | | | |
|---|---|---|---|---|
| 2004/0177002 A1* | 9/2004 | Abelow | ............. | G06Q 10/0639 705/14.19 |
| 2010/0287059 A1* | 11/2010 | McCoy | ..................... | G04G 7/02 705/26.5 |
| 2015/0088845 A1* | 3/2015 | Zhao | ...................... | G06Q 30/00 707/706 |
| 2020/0142941 A1* | 5/2020 | Box | ..................... | G06F 16/9538 |
| 2021/0390603 A1* | 12/2021 | Okano | ................... | G06Q 10/00 |

* cited by examiner

*Primary Examiner* — Luat Phung

(57) ABSTRACT

A new approach is proposed to support appliance configuration identification and profiling management. An appliance scanning component running on an appliance is configured to scan, examine, and determine current configuration of the appliance including hardware components and/or software components installed on the appliance. The configuration of the appliance is then provided to an appliance profiling engine running on a server, wherein the appliance profiling engine hashes the configuration of the appliance into a unique identifier of the appliance and look up a model of the appliance from an appliance profiling database using the unique identifier as a key. If the configuration of the appliance is not found, the appliance profiling engine identifies discrepancies between the configuration of the appliance and other appliances in the appliance profiling database to determine if the appliance is a new model, a revision of an existing model, or is simply misconfigured.

25 Claims, 2 Drawing Sheets

SYSTEM AND METHOD FOR APPLIANCE CONFIGURATION IDENTIFICATION AND PROFILE MANAGEMENT

CROSS-REFERENCE TO RELATED APPLICATIONS

This application claims the benefit of U.S. Provisional Patent Application No. 63/305,751, filed Feb. 2, 2022, which is incorporated herein in its entirety by reference.

BACKGROUND

A company may manufacture and provide to its customers a wide variety of appliances, which can include but are not limited to computing devices, communication devices, storage devices, and other types of electronic devices. These appliances can be characterized and differentiated by characteristics of their included/installed hardware and/or software components including but not limited to types of CPUs and other microprocessors, amount of memory (e.g., RAM), quantities and configurations of storage drives, operating systems (OS), firmware (e.g., BIOS, which is a firmware used to perform hardware initialization during a booting process), and many other types of components. In some embodiments, these appliances are manufactured and assembled through the same manufacturing process at a facility associated with the company. In some embodiments, the appliances are produced and queued on an as-needed basis in response to sales and inventory demands for the appliance.

In view of the wide variety of the appliances it provides, the company needs to identify the hardware and/or software components going into or installed on each appliance in order to properly provision and assign correct product mode/name to each appliance so that the appliance can be included in an inventory management system. For a non-limiting example, one appliance unit having four rotational hard disk drives (HDDs) of a specific type, 32 GB of RAM, and specific types of motherboards and CPUs should be identified and named as a backup appliance (e.g., Barracuda Backup Appliance 390), while another appliance with a solid state drive (SSD) and 8 GB of RAM etc. should be identified as a firewall (e.g., NG Firewall F12). In some embodiments, the company may further need to identify subtle revisions within each type of appliances. For a non-limiting example, Backup Appliance 390 may contain different brands of hard disk drives and/or with different firmware installed.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
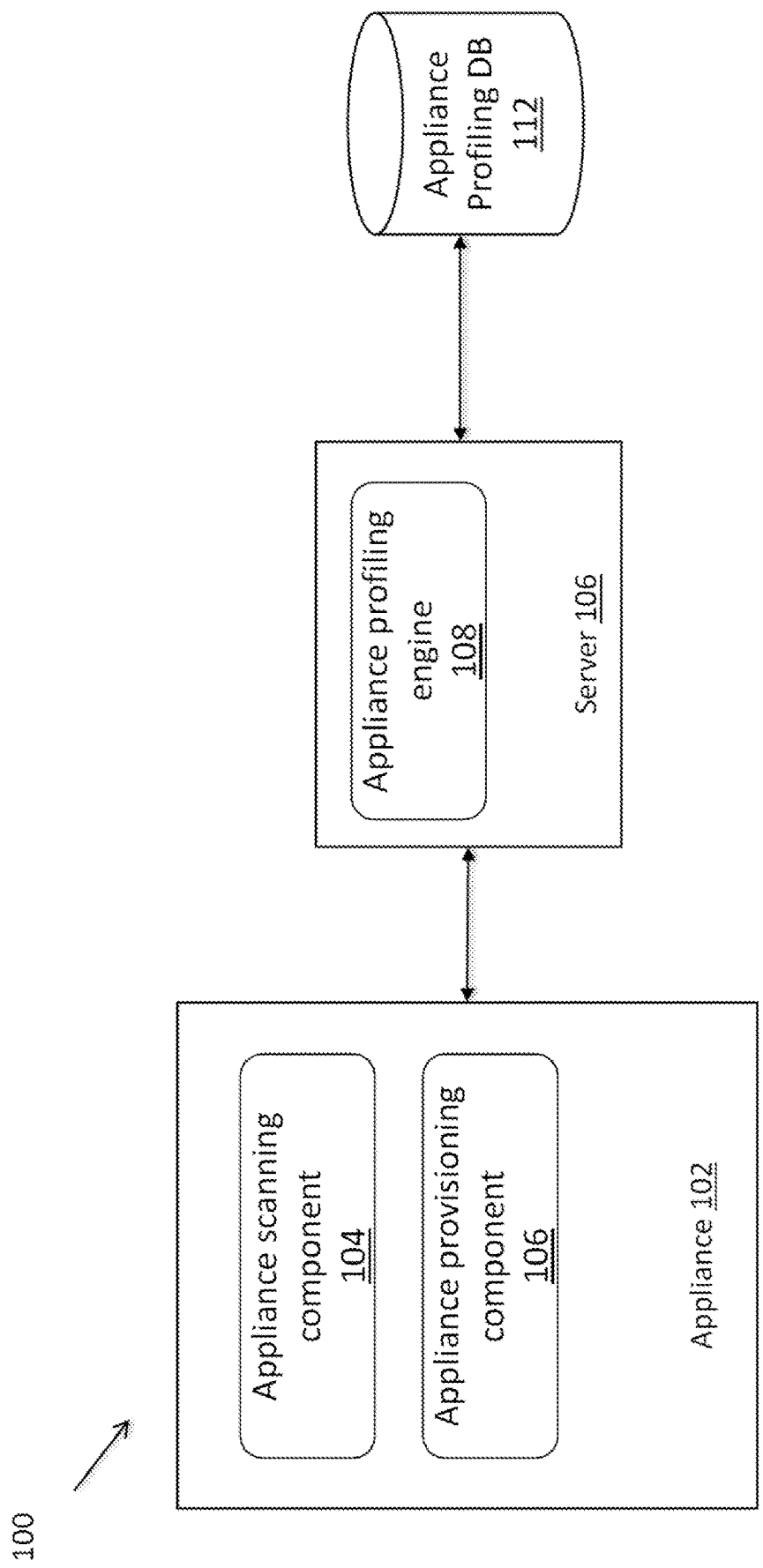
FIG. 1 depicts an example of a system diagram to support appliance configuration identification and profiling management in accordance with an aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support appliance configuration identification and profiling management. Under the proposed approach, an appliance scanning component running on an appliance is configured to scan, examine, and determine current configuration of the appliance including a plurality of hardware components and/or software components installed on the appliance. The collected configuration of the appliance is then provided to an appliance profiling engine running on a server, wherein the appliance profiling engine is configured to hash the configuration of the appliance into a unique identifier of the appliance and look up a model of the appliance from an appliance profiling database using the unique identifier as a key. If the configuration of the appliance is not found in the appliance profiling database, the appliance profiling engine is configured to identify discrepancies between the configuration of the appliance and other appliances in the appliance profiling database in order to determine if the appliance is a new model, a revision of an existing model, or is simply misconfigured (e.g., wrong amount of RAM used). If the appliance is a new model or revision of an existing model, the appliance is assigned and registered with the new model name and/or revision number, which is provided back to the appliance for identification. If the appliance is misconfigured, the appliance profiling engine additionally provides one or more correct configuration files and/or packages to the appliance for reconfiguration of the appliance.

Under the proposed approach, the hardware and/or software configurations as well as other information or metrics of all appliances being manufactured or having been deployed can be monitored and collected in real time. Based on the information collected, a user (e.g., a manufacturer of the appliances) may adjust the configurations of the appliances and their model or revision numbers adaptively based on the current demand for the appliances. For a non-limiting example, when a new appliance is to be produced, a new model name/number or a revision to an existing model is generated and registered, and a new configuration file/package can be provided to adjust the current configuration of the appliance. In some embodiments. the collected information of each appliance may serve as a birth certificate or fingerprint for the appliance for authentication purposes and to detect, prevent, and/or remediate tampering of the appliance.

FIG. 1 depicts an example of a system diagram 100 to support appliance configuration identification and profiling management. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes an appliance scanning component 104 and an appliance provisioning component 106 running on an appliance 102, an appliance profiling engine 108 running on a server 110, and an appliance profiling database 112 associated with the appliance profiling engine 108. Each of the appliance, device, server, and/or host (refer to herein as the "computing unit") running the components and/or engines in the system 100 includes software instructions stored in a storage unit such as a non-volatile memory (also referred to as secondary memory) of the computing unit. When the software instructions are executed, at least a subset of the software instructions is loaded into a memory (also referred to as primary memory) by the computing unit, the computing unit becomes a special purposed one for practicing one or more processes.

In the example of FIG. 1, each computing unit running the components in the system 100 can be a computing device, a communication device, a storage device, or any computing device capable of running a software component. For non-limiting examples, a computing device can be but is not limited to a server machine, a laptop PC, a desktop PC, a tablet, a Google Android device, an iPhone, an iPad, and a voice-controlled speaker or controller. Each computing unit has a communication interface (not shown) for communicating with each other over a communication network (not shown), which can be but is not limited to Internet, intranet, wide area network (WAN), local area network (LAN), wireless network, Bluetooth, WiFi, and mobile communication network for internal communications among entities, components, and users of an organization. The physical connections of the communication network and the communication protocols are well known to those of skilled in the art.

In the example of FIG. 1, the appliance scanning component 104 running on an appliance 102 is configured to examine the appliance 102 and to determine the current hardware and/or software configurations and/or specifications of the appliance 102 in terms of a plurality of hardware components included in the appliance 102. Here, the hardware and/or software configurations of the appliance 102 include but are not limited to numbers and types of one or more of storage devices such as hard disk drives (HDDs), solid state drives (SSDs), and/or flash (e.g., NAND) drives, memories such as Random Access Memory (RAM), including but not limited to SRAM and DRAM, and/or caches, processors such as CPUs, GPUs, and/or other microprocessors, boards such as mother boards, cards such as graphics cards, network communication cards, operating systems (OS), firmware (e.g., BIOS), and other hardware and/or software components on the appliance. In some embodiments, the appliance scanning component 104 is a software program deployed to and installed on the appliance 102 in the form of a software package or plugin during manufacturing and/or deployment of the appliance 102. Once the hardware and/or software configurations of the appliance 102 has been determined, the appliance scanning component 104 is configured to create and transmit a profile of the appliance 102 to the appliance profiling engine 108 running on the server 110, wherein the profile includes the hardware and/or software configurations and optionally other information (e.g., an IP address) of the appliance 102. In some embodiments, the appliance scanning component 104 is configured to transmit the profile of the appliance 102 to the appliance profiling engine 108 via a representational state transfer (REST) application programming interface (API), wherein the REST API allows the appliance scanning component 104 to interact with a RESTful web service provided by the appliance profiling engine 108.

In the example of FIG. 1, the appliance profiling engine 108 is configured to accept the profile of the appliance 102 and to create a unique identifier of the appliance 102 by hashing the hardware and/or software configurations of the appliance 102 via a hashing algorithm. The appliance profiling engine 108 is then configured to look up the appliance 102 from the appliance profiling database 112 using the hashed unique identifier of the appliance 102 as the key. Here, the appliance profiling database 112 is configured to maintain appliance information including but not limited to one or more of model, version, revision, configurations and specifications of each of a plurality of appliances that have been registered and/or in use. In some embodiments, the appliance information in the appliance profiling database 112 is indexed by an unique identifier representing each of the plurality of appliances and its hardware and/or software configurations. In some embodiments, the appliance profiling engine 108 is configured to retrieve and provide the hardware and/or software configurations of the appliances in the appliance profiling database 112 to a user of the system 100 upon request in real time via a user interface (UI) or an API.

If the appliance 102 is found in the appliance profiling database 112 using the hashed unique identifier of the appliance 102, the appliance profiling engine 108 is configured to retrieve information (e.g., model, version, revision, and specifications) of the appliance 102 from the appliance profiling database 112 and to provide the retrieved information of the appliance 102 to the appliance provisioning component 106 running on the appliance 102 for self-identification via, for a non-limiting example, the REST API. If the appliance 102 is not found in the appliance profiling database 112, indicating that the configurations of the appliance 102 is new or previously unknown (e.g., has not been received before), the appliance profiling engine 108 is configured to identify one or more differences/discrepancies between the hardware and/or software configurations of the appliance 102 and other appliances in the appliance profiling database 112 having similar but not identical hardware and/or software configurations as the appliance 102. In some embodiments, the appliance profiling engine 108 is configured to provide/report the differences in configurations to a user of the system 100 via an electronic communication or notification and/or enable the user to retrieve the differences in configurations via the UI or API.

If it is determined that the appliance 102 is a new model or a new revision/version of an existing model, the appliance profiling engine 108 is configured to assign and register the appliance 102 with one or more of a new serial number, a new model name and/or number, and a new revision/version number in the appliance profiling database 112 together with the hardware and/or software configurations of the appliance 102 and its unique identifier. In some embodiments, the appliance profiling engine 108 is configured to transmit the one or more of the new serial number, the new model name and number, the new revision/version number to the appliance provisioning component 106 running on the appliance 102. If it is determined that the differences is due to the fact that the appliance 102 is misconfigured, e.g., wrong type or amount of RAM or wrong version of OS or firmware is used in the appliance 102, the appliance profiling engine 108 is configured to inform the appliance provisioning component 106 running on the appliance 102 with a provision payload containing one or more reconfiguration files and/or packages. The appliance provisioning component 106 is configured to adjust the configuration of the appliance 102 according to the provision payload. In some embodiments, the appliance provisioning component 106 is configured to install and execute a provided software (e.g., a software or plug-in) on the appliance 102 in order to adjust the configuration of the appliance 102.

In some embodiments, the appliance profiling engine 108 is configured to monitor and gather metrics of a plurality of appliances being manufactured and/or deployed, wherein such metrics include but are not limited to one or more of number of models and/or revisions of the appliances along with their serial numbers and other unique identifiers (e.g., SKUs). In some embodiments, the appliance profiling engine 108 is configured to provide the gathered metrics of the appliances to the user via the API and/or a web-based browser. If it is determined that the appliance 102 belongs to an old model that has been discontinued and should no longer be in production or be deployed, the appliance profiling engine 108 is configured to de-register the model of the appliance 102 from the appliance profiling database 112 and to inform the appliance provisioning component 106 running on the appliance 102 to stop producing the model of the appliance 102. In some embodiments, the appliance profiling engine 108 is configured to alert a user if it is determined that the configurations of the appliance 102 has been altered during manufacturing or deployment, indicating that the appliance 102 may have been tampered with. In this case, the appliance 102 is marked as un-trusted and access to the appliance 102 is revoked. In some embodiments, the appliance profiling engine 108 is configured to update or fix/remediate the tampered appliance 102 by providing the latest firmware or security features to the appliance 102 via the provision payload.

Use Case—Appliance Testing

Many companies that manufacture appliances on a large scale typically have a series of test scripts that run on the appliances with or without load for testing purposes. The testing of the appliances also often involves external infrastructure (e.g., network, databases, printers, etc.) needed for testing the relevant functionalities of the appliances. With the proposed approach, the configuration information of all appliances to be tested are collected and readily available during testing. With the available configuration information of the appliances, the entire set of tools needed for testing the appliances can be highly portable and deployable "on-demand" according to the configuration information of the appliances. In fact, for every appliance that undergoes testing, one or more instances of the set of the testing tools can be configured, combined, and deployed in real-time based on the configurations of the appliance being tested. The combination of the testing tools can be dis-assembled after the testing is complete. Here, the set of testing tools includes but is not limited to a combination of virtual machines, switches, and containers that get configured automatically as they are launched for testing of the appliances.

Figure 2:
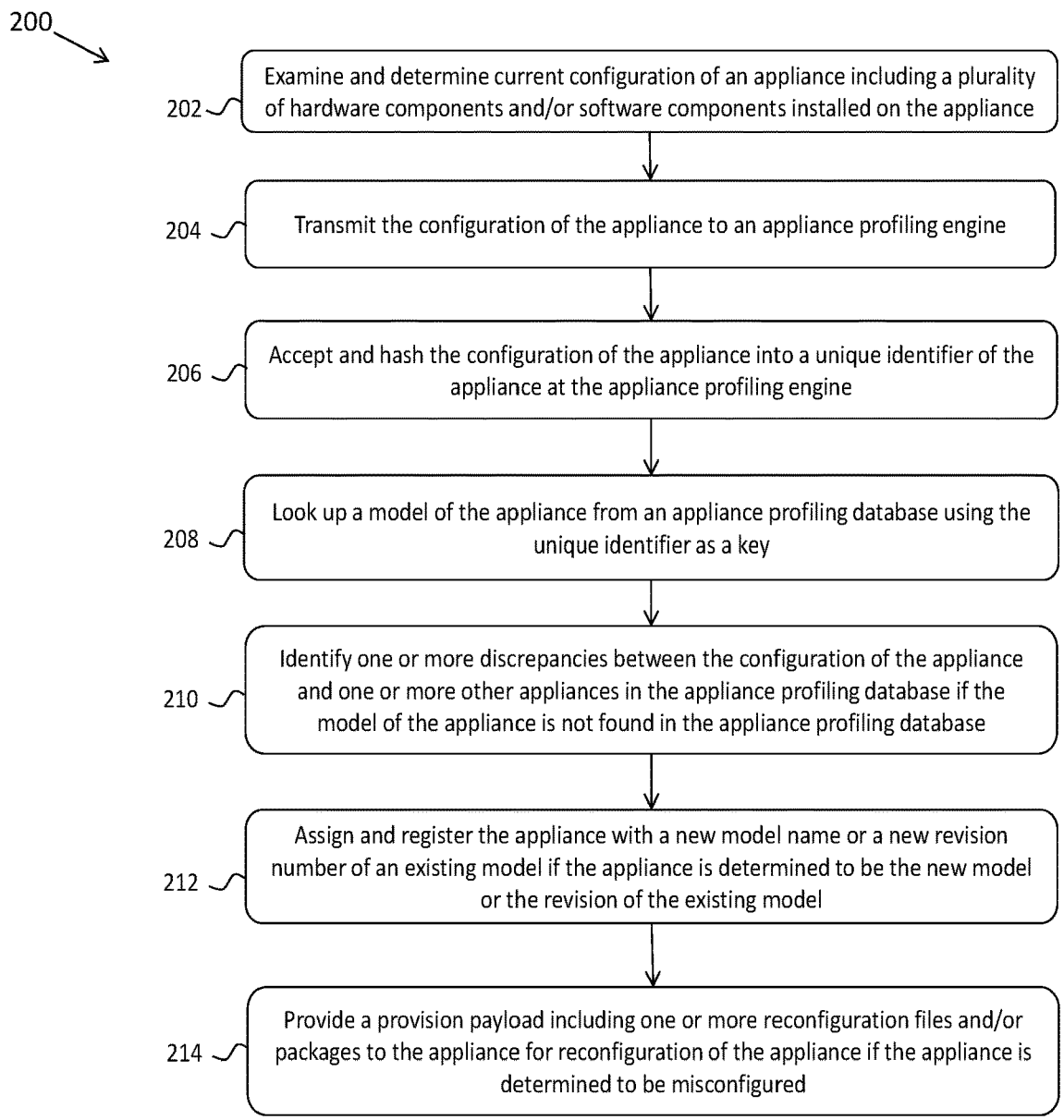
FIG. 2 depicts a flowchart of an example of a process to support appliance configuration identification and profiling management in accordance with an aspect of the present embodiments.

FIG. 2 depicts a flowchart 200 of an example of a process to support appliance configuration identification and profiling management. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where current configuration of an appliance is examined and determined including a plurality of hardware components and/or software components installed on the appliance. The flowchart 200 continues to block 204, where the configuration of the appliance is transmitted to an appliance profiling engine. The flowchart 200 continues to block 206, where the configuration of the appliance is accepted and hashed into a unique identifier of the appliance at the appliance profiling engine. The flowchart 200 continues to block 208, where a model of the appliance is looked up from an appliance profiling database using the unique identifier as a key. The flowchart 200 continues to block 210, where one or more discrepancies between the configuration of the appliance and one or more other appliances in the appliance profiling database are identified if the model of the appliance is not found in the appliance profiling database. The flowchart 200 continues to block 212, where the appliance is assigned and registered with a new model name or a new revision number of an existing model if the appliance is determined to be the new model or the revision of the existing model. The flowchart 200 ends at block 214, where a provision payload including one or more reconfiguration files and/or packages is provided to the appliance for reconfiguration of the appliance if the appliance is determined to be misconfigured.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system, comprising:
an appliance scanning component running on an appliance and configured to
   examine and determine current configuration of the appliance including a plurality of hardware components and/or software components installed on the appliance;
   transmit the configuration of the appliance to an appliance profiling engine;
said appliance profiling engine running on a server and configured to
   accept and hash the configuration of the appliance into a unique identifier of the appliance;
   look up a model of the appliance from an appliance profiling database using the unique identifier as a key;
   identify one or more discrepancies between the configuration of the appliance and one or more other appliances in the appliance profiling database if the model of the appliance is not found in the appliance profiling database;
   assign and register the appliance with a new model name or a new revision number of an existing model if the appliance is determined to be the new model or the revision of the existing model;
   provide a provision payload including one or more reconfiguration files and/or packages to the appliance for reconfiguration of the appliance if the appliance is determined to be misconfigured.

2. The system of claim 1, further comprising:
said appliance profiling database configured to maintain appliance information including one or more of model, version, revision, configurations and specifications of each of a plurality of appliances that have been registered and/or in use.

3. The system of claim 1, wherein:
the appliance information in the appliance profiling database is indexed by an unique identifier representing each of the plurality of appliances.

4. The system of claim 1, wherein:
the hardware and/or software configuration of the appliance includes one or more of numbers and types of one or more of storage devices, memories, processors, boards, cards, operating systems (OS), firmware, and other hardware and/or software components on the appliance.

5. The system of claim 1, wherein:
the appliance scanning component is configured to transmit the configuration of the appliance to the appliance profiling engine via a representational state transfer (REST) application programming interface (API).

6. The system of claim 1, wherein:
the appliance profiling engine is configured to retrieve information of the appliance from the appliance profiling database and to provide the retrieved information to the appliance for self-identification.

7. The system of claim 1, wherein:
the appliance profiling engine is configured to provide the discrepancies in configurations to a user via an electronic communication or notification and/or enable the user to retrieve the discrepancies in configurations.

8. The system of claim 1, further comprising:
an appliance provisioning component running on the appliance and configured to adjust the configuration of the appliance according to the provision payload.

9. The system of claim 8, wherein:
the appliance provisioning component is configured to install and execute a provided software on the appliance in order to adjust the configuration of the appliance.

10. The system of claim 1, wherein:
the appliance profiling engine is configured to monitor and gather metrics of a plurality of appliances being manufactured and/or deployed, wherein the metrics include one or more of number of models and/or revisions of the plurality of appliances along with their serial numbers and other unique identifiers.

11. The system of claim 10, wherein:
the appliance profiling engine is configured to de-register the model of the appliance from the appliance profiling database if it is determined that the appliance belongs to an old model that has been discontinued and should no longer be in production or be deployed.

12. The system of claim 10, wherein:
the appliance profiling engine is configured to alert a user if it is determined that the configurations of the appliance has been altered during manufacturing or deployment.

13. The system of claim 12, wherein:
the appliance profiling engine is configured to update or fix the appliance by providing the latest firmware or security features to the appliance via the provision payload.

14. A computer-implemented method, comprising:
examining and determining current configuration of an appliance including a plurality of hardware components and/or software components installed on the appliance;
transmitting the configuration of the appliance to an appliance profiling engine;
accepting and hashing the configuration of the appliance into a unique identifier of the appliance at the appliance profiling engine;
looking up a model of the appliance from an appliance profiling database using the unique identifier as a key;
identifying one or more discrepancies between the configuration of the appliance and one or more other appliances in the appliance profiling database if the model of the appliance is not found in the appliance profiling database;
assigning and registering the appliance with a new model name or a new revision number of an existing model if the appliance is determined to be the new model or the revision of the existing model;
providing a provision payload including one or more reconfiguration files and/or packages to the appliance for reconfiguration of the appliance if the appliance is determined to be misconfigured.

15. The method of claim 14, further comprising:
maintaining appliance information including one or more of model, version, revision, configurations and specifications of each of a plurality of appliances that have been registered and/or in use in the appliance profiling database.

16. The method of claim 14, further comprising:
transmitting the configuration of the appliance to the appliance profiling engine via a representational state transfer (REST) application programming interface (API).

17. The method of claim 14, further comprising:
retrieving information of the appliance from the appliance profiling database and providing the retrieved information to the appliance for self-identification.

18. The method of claim 14, further comprising:
providing the discrepancies in configurations to a user via an electronic communication or notification and/or enable the user to retrieve the discrepancies in configurations.

19. The method of claim 14, further comprising:
processing the software update asynchronously, wherein the software update sandbox takes time to monitor the behavior of the software update installed on the software update sandbox before making the software update available to the intended recipient.

20. The method of claim 14, further comprising:
adjusting the configuration of the appliance according to the provision payload.

21. The method of claim 20, further comprising:
installing and executing a provided software on the appliance in order to adjust the configuration of the appliance.

22. The method of claim 14, further comprising:
monitoring and gathering metrics of a plurality of appliances being manufactured and/or deployed, wherein the metrics include one or more of number of models and/or revisions of the plurality of appliances along with their serial numbers and other unique identifiers.

23. The method of claim 22, further comprising:
de-registering the model of the appliance from the appliance profiling database if it is determined that the appliance belongs to an old model that has been discontinued and should no longer be in production or be deployed.

24. The method of claim 22, further comprising:
alerting a user if it is determined that the configurations of the appliance has been altered during manufacturing or deployment.

25. The method of claim 24, further comprising:
updating or fixing the appliance by providing the latest firmware or security features to the appliance via the provision payload.

* * * * *